United States Patent
Nganga

(10) Patent No.: US 9,586,561 B1
(45) Date of Patent: Mar. 7, 2017

(54) AUTOMATIC AUTOMOTIVE DETAILING TOOL

(71) Applicant: Julius K. Nganga, Las Vegas, NV (US)

(72) Inventor: Julius K. Nganga, Las Vegas, NV (US)

( * ) Notice: Subject to any disclaimer, the term of this patent is extended or adjusted under 35 U.S.C. 154(b) by 686 days.

(21) Appl. No.: 14/011,045

(22) Filed: Aug. 27, 2013

Related U.S. Application Data

(60) Provisional application No. 61/693,490, filed on Aug. 27, 2012.

(51) Int. Cl.
  *A46B 13/04* (2006.01)
  *A46B 13/02* (2006.01)
  *A46B 11/00* (2006.01)
  *B60S 3/04* (2006.01)
  *A46B 13/00* (2006.01)

(52) U.S. Cl.
  CPC ............ *B60S 3/047* (2013.01); *A46B 13/008* (2013.01); *A46B 13/02* (2013.01); *A46B 11/0062* (2013.01); *A46B 13/04* (2013.01); *A46B 2200/3046* (2013.01)

(58) Field of Classification Search
  CPC ........ A47L 13/04; A47L 13/008; A47L 13/02; A47L 13/0095; A47L 11/001; A47L 11/0062; A47L 2200/3046
  USPC .......................................... 15/29, 50.1, 49.1
  See application file for complete search history.

(56) References Cited

U.S. PATENT DOCUMENTS

| | | |
|---|---|---|
| 3,091,790 A * | 6/1963 | Schroeder ............. E04D 13/106 15/105 |
| D254,231 S | 2/1980 | Burglin et al. |
| 4,188,682 A | 2/1980 | Burglin et al. |
| D264,797 S | 6/1982 | Burglin et al. |
| 4,791,694 A | 12/1988 | Itaya et al. |
| 4,965,905 A | 10/1990 | Kitahata et al. |
| D312,714 S | 12/1990 | Simonelli et al. |
| D313,094 S | 12/1990 | Itaya et al. |
| 5,664,634 A | 9/1997 | McCracken |
| 2004/0237228 A1* | 12/2004 | King ....................... A47L 11/03 15/50.1 |
| 2004/0250365 A1* | 12/2004 | Anderson .......... A46B 15/0081 15/111 |
| 2012/0090115 A1* | 4/2012 | Parsons .................... A47K 7/08 15/143.1 |

* cited by examiner

*Primary Examiner* — Monica Carter
*Assistant Examiner* — Stephanie Berry
(74) *Attorney, Agent, or Firm* — Robert C. Montgomery; Montgomery Patent & Design LP.

(57) ABSTRACT

An automatic automotive detailing tool utilizes a motorized tool and a plurality of interchangeable head attachments. The motorized tool is particularly suited for use with both cars and boats. The tool is adapted to receive and operate a plurality of interchangeable head attachments. The interchangeable head attachments can perform a variety of functions ranging from cleaning to waxing to buffing.

19 Claims, 7 Drawing Sheets

AUTOMATIC AUTOMOTIVE DETAILING TOOL

RELATED APPLICATIONS

The present invention was first described in and claims the benefit of U.S. Provisional Application No. 61/693,490, filed Aug. 27, 2012, the entire disclosures of which are incorporated herein by reference.

FIELD OF THE INVENTION

The present invention relates to a detailing tool particularly suited for use on automobiles having an automatic washing mechanism.

BACKGROUND OF THE INVENTION

Among the many chores that we all must face is the task of keeping our cars clean and eye-catching. For many Americans, their car is a source of personal pride and keeping it eye-catching is not just a chore, it is an obsession. Regardless of the situation, there are literally thousands of products and tools whose aim is to make this task easier. Such tools include buffers, orbital polishers, long handled brushes, and the like, each dedicated to serving one (1) particular need when cleaning or waxing vehicles. Unfortunately, this wide variety of tools often causes confusion, making the process of cleaning or waxing a vehicle a complicated one (1). Many users then feel that the time and effort expended is not worth the end result, and end up forgoing cleaning. These same problems are exaggerated and compounded when working with large vehicles such as: boats, recreational vehicles, and the like. Accordingly, there exists a need for a means by which all types of motor vehicles can be easily cleaned, waxed, buffed, and polished using only one device which simplifies the process. The development of the present invention fulfills this need.

Prior art in this field consists of brushes, clothes, and padded sponges. Some of these items are even attached to distal portions of elongated handles. These devices, however, lack the automated motion needed to provide a consistent shine and polish. Furthermore, none of the prior art enables a user to clean, scour, and polish with one (1) tool. Some automated devices do exist but these are heavy and cumbersome. These automated devices typically require the use of two (2) hands. Moreover, none of these automated devices provide the use of an extension handle to clean and polish surfaces beyond an arms-reach of a user. Furthermore, these automated devices lack the ability to house and dispense cleansing and polishing solutions while employing the device. It is an objective of this invention to provide an automated means to clean and polish vehicle surfaces with or without an extension pole so that cleansing and polishing can be performed at distances greater than an arms-length reach. It is a further object of this invention to enable the extension pole to adjust in a telescoping manner and enable a user to selectively set a desired length. It is a further objective of this invention to provide a user the opportunity to employ the automated tool with soap or cleansing solutions that can be dispensed at the discretion of the user. It is a further objective of this invention to provide a user with a plurality of interchangeable pads so that a user can perform a cleansing, a scouring, or polishing functions all with one (1) tool.

SUMMARY OF THE INVENTION

The tool comprises a head and a removable, extension pole. Pads are removably attached to the head and placed into electro-mechanical connection with a motor that rotates the pads. The extension pole provides a user with an extended reach when employing the tool. The head is a housing containing the electrical and mechanical components of the tool, and is provided with control switching to enable operation of the tool. A portion of the housing is provided with electrical and mechanical connections to enable attachment of a rechargeable battery unit, if so desired. Within the housing is a pivotally attached container for liquid soap and cleaning solutions, which is placed into fluid communication with a pump. The pump is used to dispense the liquid contents held within the container within proximity of the pad. The configuration of the container and the method of attachment to the housing facilitate easy access to the container for maintenance and servicing. The container is further provided with a carrier air fitting to facilitate fluid communication to the pump and to enable drawing liquid soap from the container and into the pump flow through an air tube. The air tube of the pump, after drawing liquid soap form the container, disposed the liquid soap in proximity to a pad portion of the tool, whereby the pad entrains the liquid soap to be applied to a surface of a vehicle, boat, or similar object.

Various interchangeable pads that can be attached to a surface of the head are provided for the tool. When attached, each pad is placed into electro-mechanical connection with an electric motor and transmission of the head. The configuration of the electric motor and transmission is such that it causes an attached pad to rotate when activated. Each pad has a top portion comprising a planar discus having a coupling, and a bottom portion comprising of various materials suited for cleaning, scouring, or polishing. The coupling enables connection and engagement with the transmission.

The extension pole is removably connected to the head housing to provide a longer reach for a user employing the tool. The pole has a telescoping construction in which there is a stationary tube and an extension tube, where the extension tube traverses the stationary tube thereby providing varying lengths. A desired length is chosen by a user by extending the extension tube and locking it in place with the use of a collet ring.

The tool is a multipurpose electric tool to assist in cleaning, polishing, buffing, and waxing motor vehicles, boats, and similar items. This long length is especially beneficial when reaching typically inaccessible areas on motor vehicles such as roofs, trunks, hoods, and the like. The various interchangeable heads can be applied and removed without the use of tools, and can be replaced when worn. The use of the present invention allows users the ability to clean, wax, buff, and polish their motor vehicles using only one device in a manner which is quick, easy, and effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
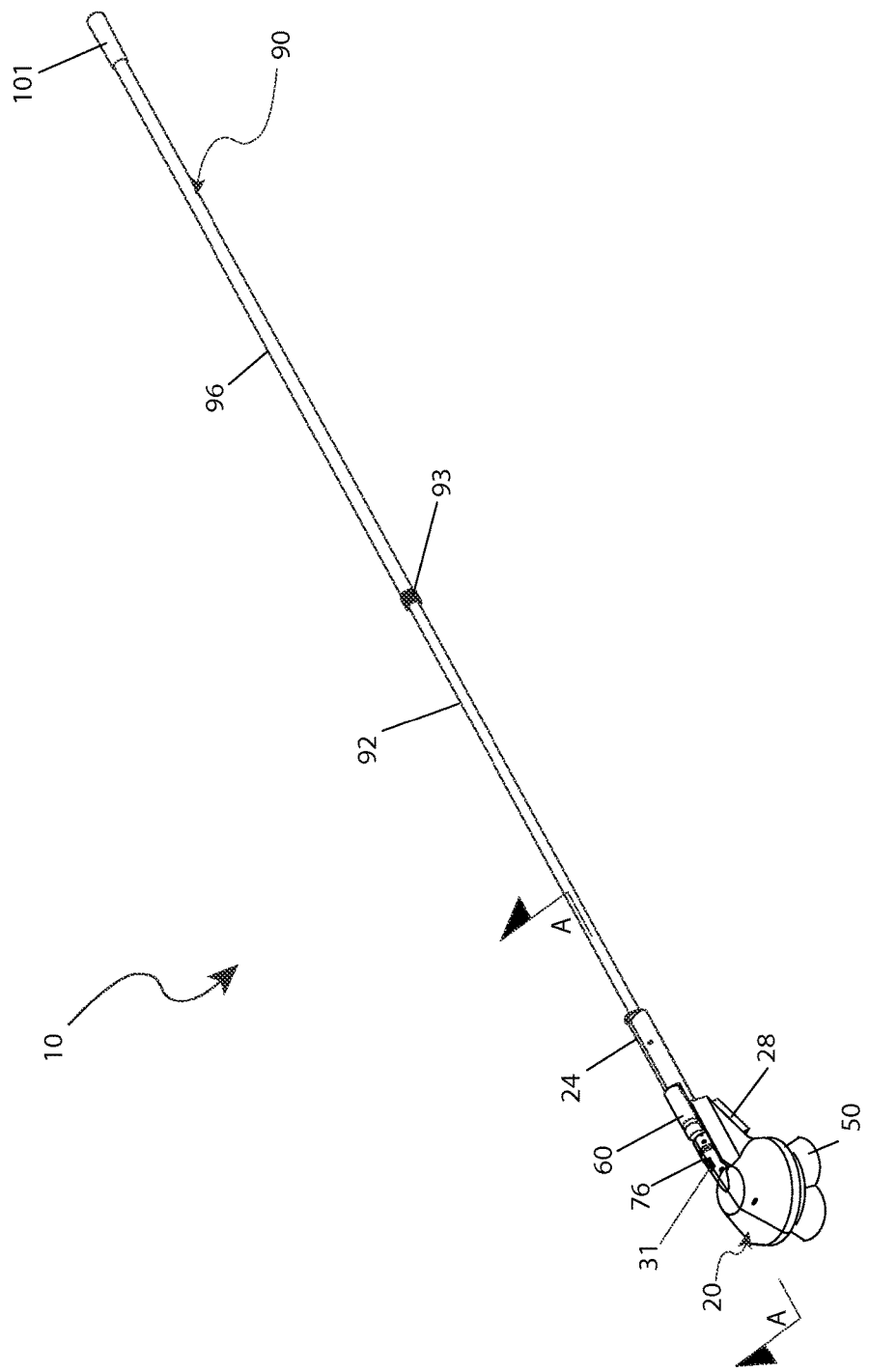
FIG. 1 is an isometric view of an automatic automotive detailing tool 10 depicted with a generic pad 50 with an extension pole 90 in accordance with the preferred embodiment of the present invention.

DESCRIPTIVE KEY 10 automatic automotive detailing tool
20 head
22 housing
23 housing fastener
24 handle
25 internally threaded well
28 battery pack
31 on/off switch
32 wiring
33 motor
34 drive shaft
35 bearing
36 lip seal
37 spindle
38 spindle hub
39 spindle thread
40 pivot assembly
42 inner retainer
43 diaphragm
44 outer retainer
45 chuck
46 drive pin
47 receiver
48 drive pin cavity
49 pin retainer
50 pad
51 cleaning pad
52 scrubbing pad
53 polishing pad
54 brush
55 discus
60 soap container
61 neck
62 container thread
63 sidewall
64 interior
65 bottom
66 dip tube
67 carrier
68 carrier head
69 carrier thread
70 seal ring
71 carrier pivot
72 carrier pivot pin
73 pivot pin retainer
74 air pump
75 air pump motor
76 pump switch
77 air tube
78 conveying tube
79 outlet port
81 air pump fitting
82 carrier air fitting
83 carrier air channel
84 dip tube fitting
85 fluid channel
86 exterior fluid fitting
87 exit fitting
90 extension pole
91 threaded end
92 extending tube
93 collet ring
94 internal collet taper
95 internal collet thread
96 stationary tube
97 kerf
98 external taper
99 external thread
101 padding

DETAILED DESCRIPTION OF THE PREFERRED EMBODIMENT

The best mode for carrying out the invention is presented in terms of its preferred embodiment, herein depicted within FIGS. 1 through 9. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an automotive detailing tool (herein referred to as the "tool") 10, which provides a means for an electric tool to assist in the cleaning, waxing, and polishing of the exterior of an automobile. While this invention was originally conceived to function relative to detailing an automobile, it is understood that such a device, with the stated capabilities, can find broader applications in the cleaning and/or polishing, and buffing of a wide variety of surfaces without limiting the scope of this invention.

Figure 2:
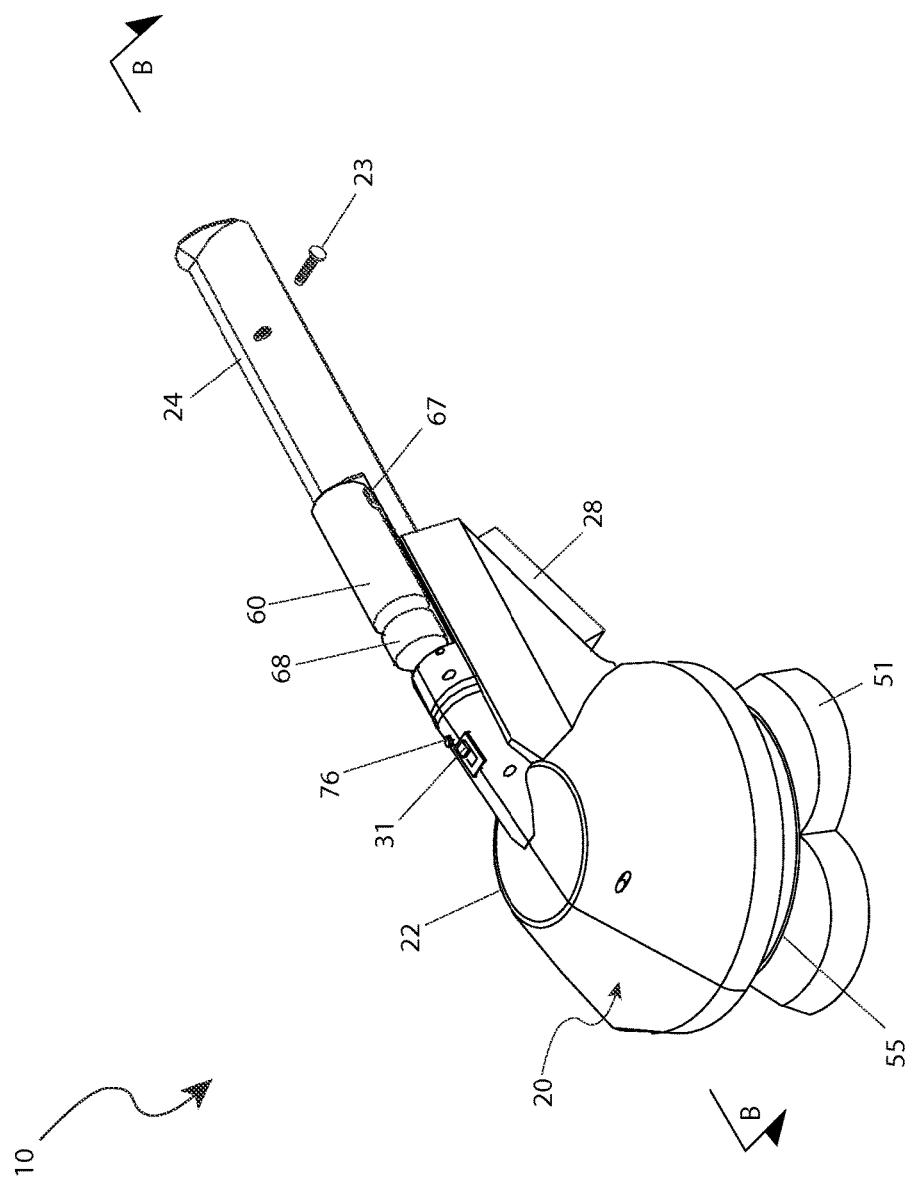
FIG. 2 is an isometric view of a head 20 of the automatic automotive detailing tool 10 depicted with a cleaning pad 51 in accordance with the preferred embodiment of the present invention.

Referring now to FIG. 1, an isometric view of the tool 10 with an extension pole 90, and FIG. 2, an isometric view of the head 20 of the tool 10, according to the preferred embodiment of the present invention, are disclosed. The tool 10 includes a head 20 and a removable, extension pole 90. The head 20 is comprised of a housing 22 containing the various drive mechanisms and forms into a handle 24 which may be used to comfortably grasp and control the tool 10. The housing 22 is comprised preferably of a thermoplastic material and constructed from a plurality of injection-molded parts to be fastened together with a number of housing fasteners 23. In some embodiments, a gasket material, or some other means of sealing the interior of the housing 22 against the environment, may be employed in the construction of the head 20 of the tool 10. The assembled housing 22 contains provisions for attaching a rechargeable battery pack 28 so that electrical power may be provided to the tool 10 so as to remain cordless. The battery pack 28 may be any of a variety of commercially available devices which can be recharged by a separate means, or a specialty device without limiting the scope of the tool 10. The cordless feature of the tool 10, while seen as a positive enhancement, is not a defining point of the invention and could be abandoned for another means of providing electrical power to said tool 10 without limiting the scope of the invention.

Figure 3:
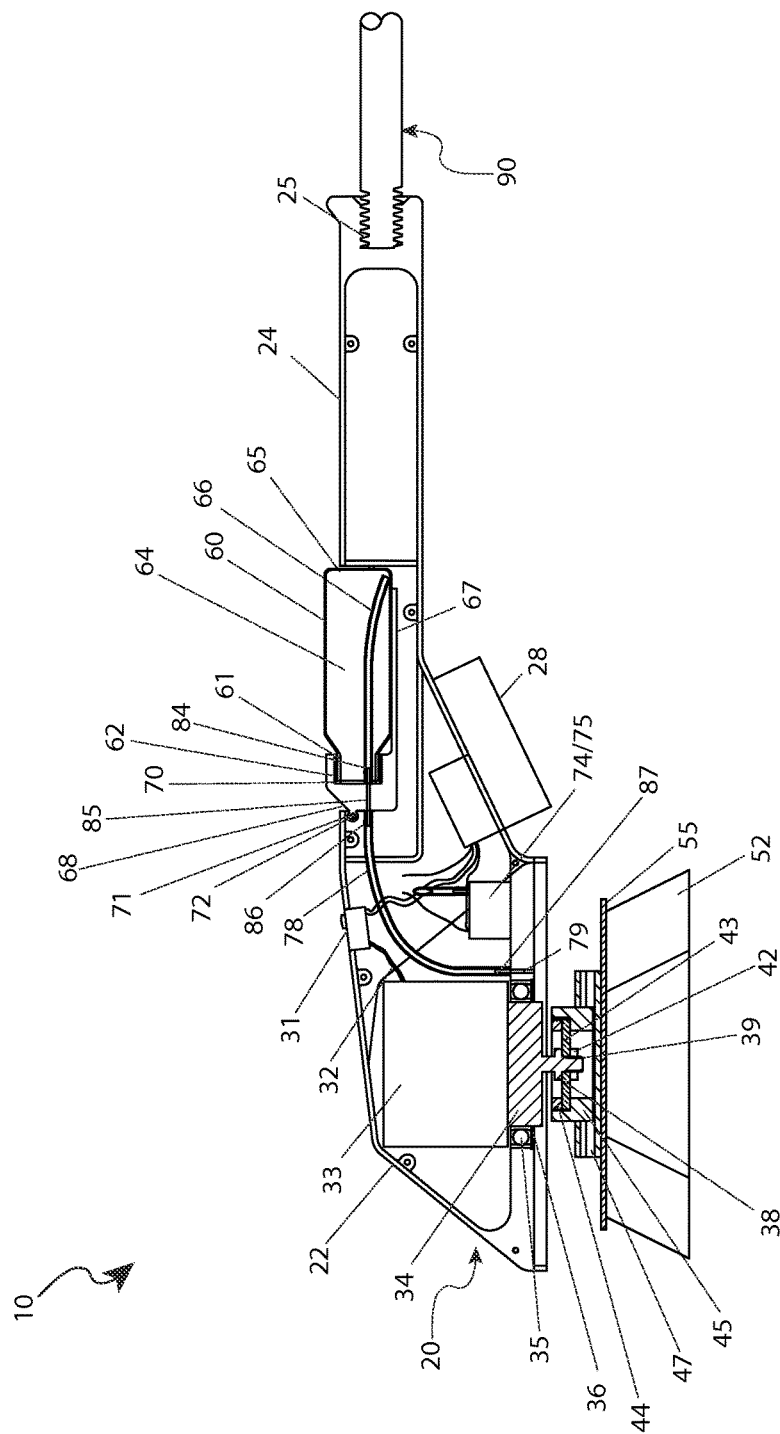
FIG. 3 is a section view along a line A-A as shown on FIG. 1 of the automatic automotive detailing tool 10 depicted with a scrubbing pad 52 in accordance with the preferred embodiment of the present invention.
Figure 4:
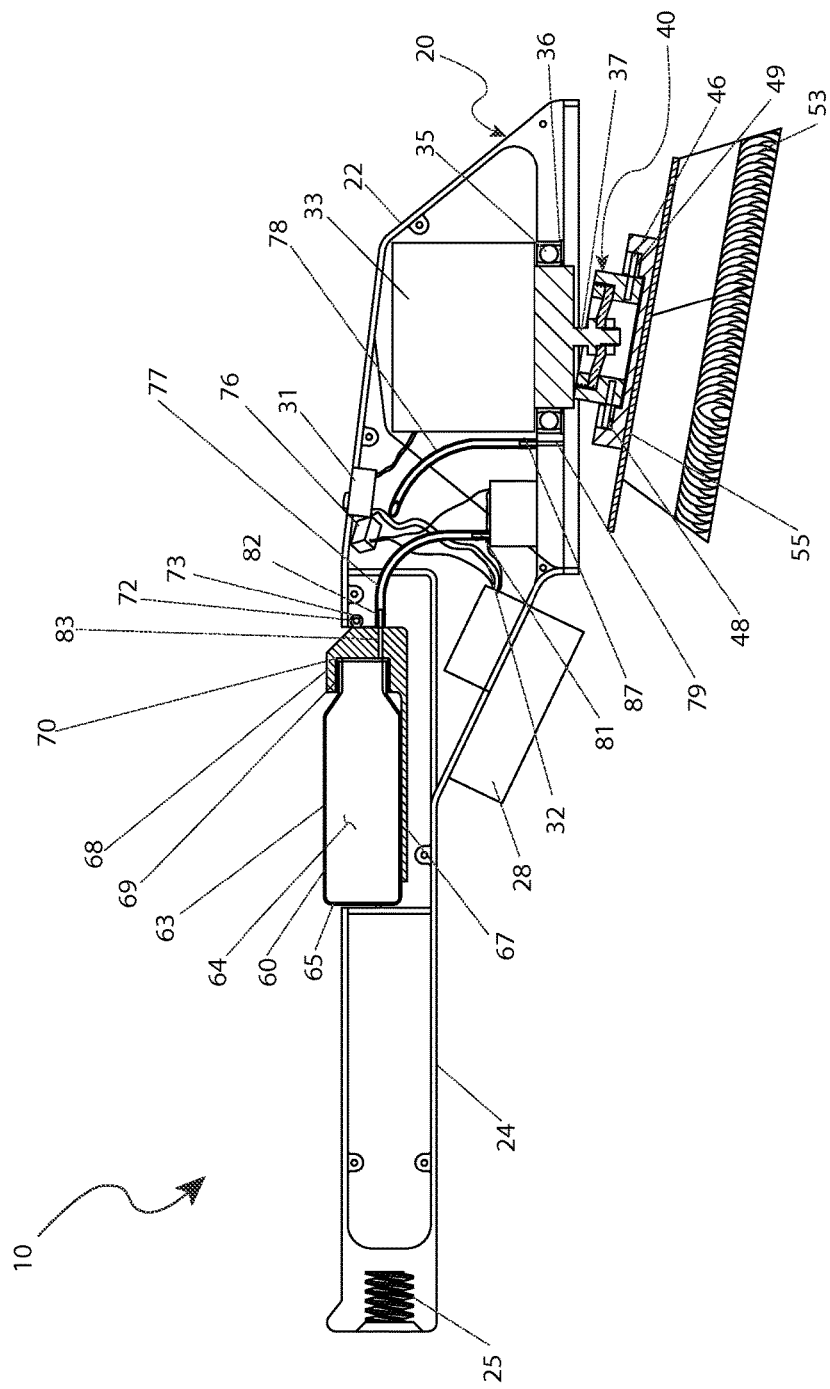
FIG. 4 is a section view along line B-B as shown on FIG. 2 of the automatic automotive detailing tool 10 with a polishing pad 53 and pivot 40 depicted in a tilted position in accordance with the preferred embodiment of the present invention.

The on/off switch 31 is located preferably on an upper surface of the housing 22 and is comprised of an electrical switching device, such as a two (2) position slide switch, to activate the motor 33 at the discretion of the user. The on/off switch 31 is electrically interconnected to the battery pack 28 via appropriately gauged, internally routed, electrical wiring 32 as seen in FIG. 3 and FIG. 4.

Disposed upon an upper portion of the head 20 is a feature for the inclusion of a soap container 60 which is provided for the storage and introduction of a liquid cleaning solution, or similar product, during the use of the tool 10. The soap container 60 is disposed in a carrier 64 which is pivotally attached to an interior portion of the housing 22 for the convenience of removing said soap container 60 from the tool 10 for the purpose of placing various solutions into said soap container 60. In proximity to the on/off switch 31 is a pump switch 76 which is preferably a momentary contact, push-button switching device used to electrically activate an air pump motor 75 that is used to drive an air pump 74 to ultimately dispense the aforementioned cleaning solution, or an alternative, from the soap container 60.

A proximal end portion of the handle 24 contains an internally threaded well 25 to provide a means to attach an extension pole 90, if desired, to access more remote areas.

The tool 10 will be provided with a plurality of interchangeable pads 50, comprised of various materials, suited for the particular purposes for which the tool 10 was intended. The preferred embodiment of the present tool 10 will involve a cleaning pad 51 preferably comprised of an open-cell foam material, a scrubbing pad 52 preferably comprised of a mesh type textile or modified plastic material, a polishing pad 53 preferably comprised of a layered microfiber textile material, and a brush 54 preferably comprised of a single cylinder, or cone, with attached nylon, or other suitable material, bristles. Other pads 50 comprised of other materials as well as pads 50 comprised of the same materials arranged in a different fashion may also be used without limiting the scope or adaptability of the tool 10.

Referring now to FIG. 3, a section view along line A-A as seen in FIG. 1, and FIG. 4, a section view along line B-B as seen in FIG. 2, of the tool 10, according to the preferred embodiment of the present invention, are disclosed. The tool 10 has an electric motor 33 which provides the principle motion for the various pads 50. The motor is secured to the housing 22 and is electrically connected to the battery pack 28 through the on/off switch 31 by means of the wiring 32. The motor 33 is comprised of any of a variety of commercially available, copper wound, low voltage, small frame, direct current, motors 33 with a cylindrical drive shaft 34 capable of generating sufficient torque to induce the desired rotational motion in the spindle 37. The drive shaft 34 projects through the lower side of the housing 22 and is of sufficiently large diameter so that a chuck 45 will come into contact with the lower face of said drive shaft 34 to define the maximum limit of flexure of the pivot assembly 40. The drive shaft 34 is supported laterally by a ball bearing 35 captured in the housing 22. A lip seal 36 is disposed at the lower end of the bearing 34 and captured in the housing 22 in order to keep the bearing 34 from being contaminated by material that could possibly enter from below the tool 10. The drive shaft 34 is reduced in diameter to comprise a cylindrical spindle 37 on the lower face. This spindle 37 can be formed with the drive shaft 34 at the time of fabrication, or added at a later time as a threaded or pressed insert without changing the scope of the tool 10. Disposed upon the spindle 37 is a spindle hub 38 which is an increase in the diameter of said spindle 37 to form a disk for the eventual retention of a diaphragm 43. Disposed at the lower end of the spindle 37 is a spindle thread 39. This spindle thread 39 is preferably of a standard unified fine thread appropriate to the diameter of the spindle 37. It is understood that the drive shaft 34, the spindle 37 and the spindle hub 38 may be provided with any machining reliefs as necessary without limiting the scope of the tool 10.

The diaphragm 43 is a circular disc preferably comprised of an elastomeric material with a center aperture sized to accommodate the diameter of the spindle 37. The diaphragm 43 is specifically compounded of a modified rubberized material to transmit a torque while allowing a misalignment from the inner diameter to the outer diameter without a concurrent buildup of heat that would otherwise structurally degrade another type of material. An inner retainer 42 is preferably comprised of a metal disk having an internal thread matching the spindle thread 39. The inner retainer 42 is threaded onto the spindle thread 39 of the spindle 37 and clamped against the diaphragm 43 to capture a portion of said diaphragm 43 at the inner diameter between the spindle hub 38 and said inner retainer 42. The chuck 45 is an annular disk preferably comprised of steel, or some other metal, with an outer diameter of the approximate size of the drive shaft 34 of the motor 33, and an inner diameter somewhat less than the outer diameter of the diaphragm 43. The chuck 45 would preferably be fabricated with a step feature in the upper surface with the diameter of such a step being slightly larger than the outer diameter of the diaphragm 43 and of a depth sufficient to accommodate the thickness of said diaphragm 43 as well as the thickness of an outer retainer 44. The diameter of the step feature in the upper surface of the chuck 45 would be provided with an internal thread preferably of a standard unified fine thread appropriate to the diameter of such a step. The chuck 45 would also be provided with at least two (2) drive pins 46 inserted into the outer periphery of the chuck 45 preferably at a vertical location below the aforementioned step and yet above the lower surface of said chuck 45. The outer retainer 44 is preferably comprised of a metal disk having an external thread matching the internal thread cut into the diameter of the step in the chuck 45. The outer retainer 44 is threaded onto the chuck 45 and clamped against the diaphragm 43 to capture a portion of said diaphragm 43 at the outer diameter between the step of the chuck 45 and said outer retainer 44. The construction of the pivot assembly 40 in this manner allows power to be transmitted from the drive shaft 34 of the motor 33 to the drive pins 46 in the chuck 45 while allowing a certain amount of continuous flexure. It is understood that any of the surfaces in contact with the diaphragm 43 may be enhanced with radial ridges, or other such features, to improve the transmission of torque without modifying the scope of the tool 10.

The material of each pad 50 is preferably attached to a flat round discus 55 which is comprised of a thermoplastic material. The discus 55 would be attached to a bottom surface of a receiver 47 by some method such as gluing or thermal welding. The receiver 47 is preferably comprised of a disk of a thermoplastic material with a concentric step feature formed into the center of an upper surface. Disposed in the upper surface of the receiver 47 and located at the periphery of the step feature are at least two (2) drive pin cavities 48. A drive pin cavity 48 is comprised of a vertical slot sized to accommodate a sliding fit with an individual drive pin 46, extending downward to some depth and then converting to a horizontal slot at a ninety degree (90°) orientation. This "L"-shaped configuration would allow the drive pins 46 to be inserted into the drive pin cavities 48 while simultaneously fitting the lower portion of the chuck 45 into the step feature of the receiver 47. By giving a partial turn of the receiver 47 relative to the chuck 45, the two (2) pieces will be secured together. In this manner, the rotation of the drive shaft 34 will cause a concurrent rotation of the pad 50. A pin retainer 49, preferably comprised of a spring pin formed as a sinusoidal wave with a plurality of troughs, could help retain the drive pins 46 in the drive pin cavities 48 until such time as the user would give a counter-rotational turn on the receiver 47 to disengage said drive pins 46 and remove the pad 50.

The soap container 60 is comprised preferably of a high density polyethylene material, and can be molded to have the necessary physical features of a container as seen in FIG. 3, i.e., a cylindrical sidewall 63 adjoined to a neck 61 and terminating in a bottom 65 to form an interior 64 capable of holding a volume of cleaning solution. Disposed upon the neck 61 would preferably be a container thread 62 of some standard thread form to conveniently attach the soap container 60 to the tool 10. The soap container 60 is attached to and suspended in a carrier 67 which is preferably comprised of a thermoplastic material and formed in an injection molding process. The carrier 67 is comprised of a carrier head 68 which would envelop and retain the neck 61 of the soap container 60, as well as a flat horizontal member attached to the carrier head 68 which would be positioned under said soap container 60 to assist in supporting the sidewall 63, and an arcuate vertical member attached to the horizontal member to partially encircle said soap container 60 as a cradle. The bottom 65 of the soap container 60, as well as a portion of the sidewall 63 would preferably remain accessible in order to more easily remove said soap container 60 from the carrier 67 for servicing. The inside of the carrier head 68 would preferably be provided with a carrier thread 69 of the complimentary form of the container thread 62 in order to secure the soap container 60 to the carrier 67.

Disposed inside the carrier head 68, near the interior terminus of the carrier thread 69 is a seal ring 70 preferably comprised of a rubber, or nitrite, washer. The seal ring 70 would preferably be of sufficient thickness that when the container thread 62 on the neck 61 of the soap container 60 is engaged into the carrier thread 69 in the carrier 67, the seal ring 70 would be compressed and a liquid tight barrier would be formed between the carrier head 68 and the soap container 60. In this manner, leakage from the soap container 60 to the exterior will be eliminated and a closed system will be achieved for the transfer of fluids.

Disposed on the exterior of the carrier head 68 are a carrier air fitting 82 for the ingress of air into the soap container 60 and an exterior fluid fitting 86 for the egress of fluid from said soap container 60. A carrier air channel 83 is comprised of a cylindrical channel bored through the carrier head 68 in line with the carrier air fitting 82 to permit the free flow of air into the soap container 60. A fluid channel 85 is comprised of a cylindrical channel bored through the carrier head 68 in line with and connecting a dip tube fitting 84 which is disposed inside of said carrier head 68 with the exterior fluid fitting 86 for the free flow of fluid from the soap container 60 through said carrier head. The dip tube 66 is comprised of a durable plastic or rubber hose, or other such material, and is connected, by an interference fit, to the dip tube fitting 84 on the interior of the carrier head 68 at a first end and is open inside of the soap container 70 at the second end.

Figure 5:
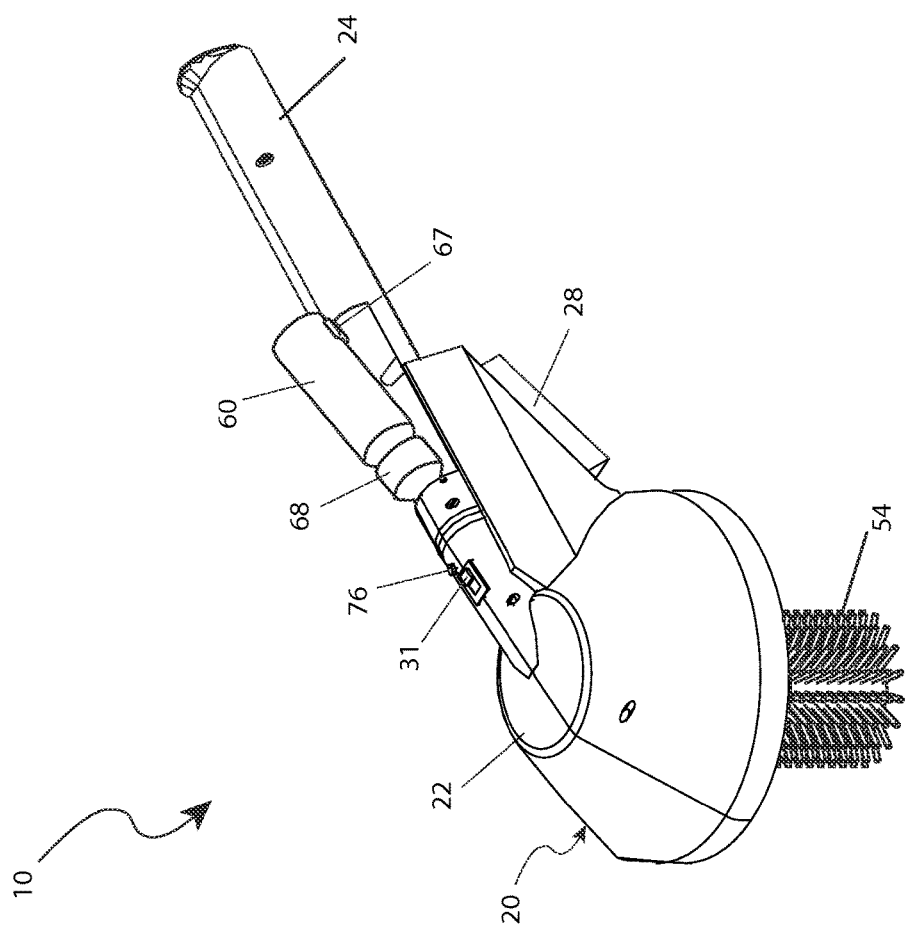
FIG. 5 is an isometric view of the head 20 of the automatic automotive detailing tool 10 depicted with a brush 54, and with the soap container 60 pivoted away from the handle 24 for servicing in accordance with the preferred embodiment of the present invention.
Figure 6:
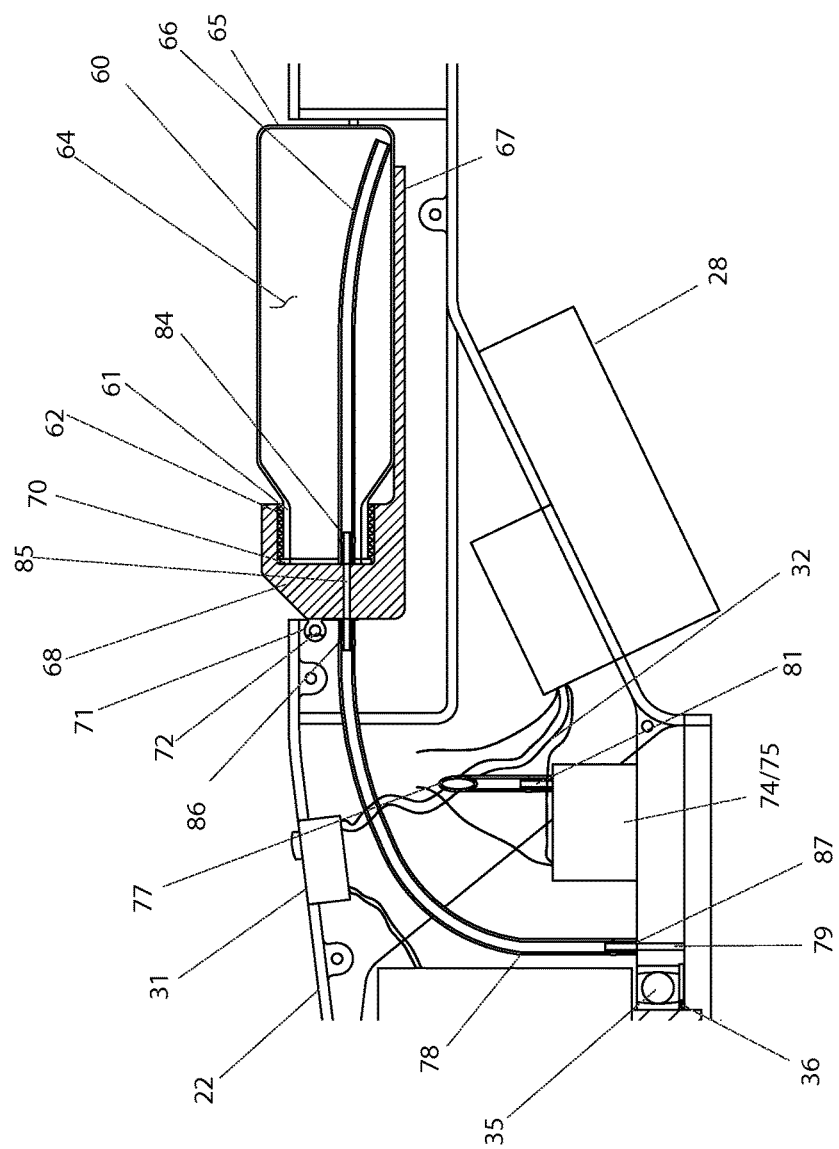
FIG. 6 is an enlarged section view cut through the soap container 60 and the carrier head 68 of the automatic automotive detailing tool 10 in accordance with the preferred embodiment of the present invention.

Also disposed on the exterior of the carrier head 68 is carrier pivot 71 feature. The carrier pivot 71 is comprised of a cylindrical channel having an opening along the longitudinal axis on that side opposite from the point of attachment so as to present a "C"-shaped configuration in a cross-sectional view. The carrier pivot 71 may be formed with a flared opening to provide for a more simplified fit on the carrier pivot pin 72. The carrier pivot pin 72 is preferably a cylindrical metal bar inserted into the pivot pin retainers 73 on either half of the housing 22 pieces to serve as an axis of rotation for the carrier 67. The rotation of the carrier 67 out of the housing 22, as seen in FIG. 5, exposes the bottom 65 of the soap container 60 and thereby provides the necessary clearance to remove said soap container 60 from the tool 10 for servicing. The pivot pin retainers 73 are comprised of an amorphous build up of the material of the housing 22 into which in-line cylindrical channels have been bored for the retention of the carrier pivot pin 72. The cylindrical channel may have an exterior opening in the housing 22 to facilitate the correct alignment of said channel and the retained carrier pivot pin 72.

The depression of the pump switch 67 on the exterior of the housing 22 will cause the air pump motor 75 to drive the air pump 74 to compress air into the first end of an air tube 77 attached to an air pump fitting 81 on the outlet side of said air pump 74. This air tube 77 is preferably comprised of a durable plastic or rubber hose and would be attached at a second end to the carrier air fitting 82 on the carrier head 68. As air pressure builds up in the air tube 77, the air would be forced into the carrier air fitting 82, through the carrier air channel 83, and will exert pressure upon the air/solution interface in the soap container 60 thereby forcing liquid into an open end of a dip tube 66. The open end of the dip tube 66 would be in proximity to the bottom 65 of the soap container 60 in order to remain submerged in the liquid for as long as possible. When the open end of the dip tube 66 is no longer submersed, the fluid will no longer be transferred to the conveying tube 78 and the soap container 60 will require refilling.

As the soap solution is forced into the open end of the dip tube 66 it will be transferred through the dip tube fitting 84, the fluid channel 85 in the carrier head 68, and the exterior fluid fitting 86 into a conveying tube 78. The conveying tube 78 is comprised of a durable plastic or rubber hose and is connected, by an interference fit, to the exterior fluid fitting 86 on the carrier head 68 at a first end and to an exit fitting 87 on the inside bottom of the housing 22 near the drive shaft 34 at a second end. The outlet port 79 is comprised of a cylindrical channel bored through the bottom of the housing 22, in line with the exit fitting 87 such that the soap solution is dispensed from the tool 10 in proximity to the pad 50. Any of the aforementioned fittings may be "barbed" for the secure installation of the air tube 77, the dip tube 66, or the conveying tube 78. The air tube 77 and the conveying tube 78 are provided with sufficient length to accommodate the aforementioned pivoting of the carrier 67 without pinching or crimping said tubes 77, 78. It is understood, however, that the tool 10 may be configured without the soap container 60, if desired, in order to avoid the inadvertent application of a soap solution during a procedure, or function, which did not require soap.

Figure 7:
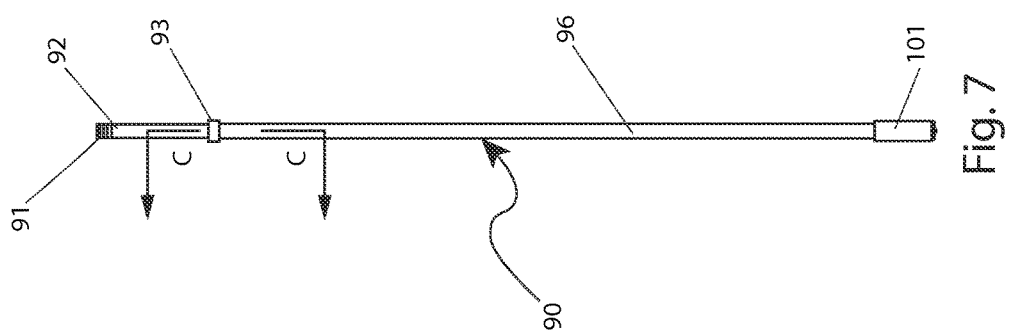
FIG. 7 is a view of the extension pole 90 of the automatic automotive detailing tool 10 in accordance with the preferred embodiment of the present invention.

The extension pole 90 as shown in FIG. 1 and FIG. 7 is comprised of an extending tube 92 telescoping from a stationary tube 96, and a tightening collet ring 93. The extending tube 92 and the stationary tube 96 are preferably fabricated from round steel tubing, complying with drawn over mandrel specification, of a size and gauge to achieve a sliding fit with each other. The extending tube 92 and the stationary tube 96 are preferably plated or coated with a protective material to inhibit corrosion. Disposed in a first end of the extending tube 92 is a threaded end 91. The threaded end 91 is preferably comprised of a thermoplastic material formed in an injection molding process as a cylinder with an external thread cut, or formed, into the outside diameter of one (1) end to a length of approximately fifty percent (50%) of the length of said threaded end 91. The external thread would preferably be any one (1) of a standard acme thread to be accommodated in the internally thread well 25 in the handle 24. The second end of the threaded end 91 would preferably be pressed into the inside diameter of the extending tube 92. It is understood that alternate materials of construction, and/or modes of attachment could be employed without limiting the scope of this tool 10.

Figure 9:
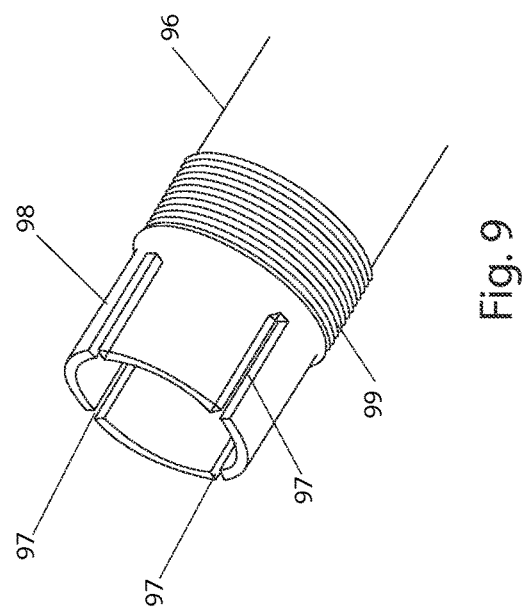

Disposed on a first end of the stationary tube 96 is an external taper 98 followed by an external thread 99. The external thread 99 is preferably of a unified fine thread profile formed upon the outside diameter of the stationary tube 96. The external taper 98 is the result of the removal of a decreasing amount of the tube wall of the stationary tube 96 from the first end to the external thread 99. The first end of the stationary tube 96 preferably has four (4) kerf 97 slots in the external taper 98 which are accomplished with two (2) perpendicular saw cuts across the diameter of the stationary tube 96 as seen in FIG. 9. Disposed on the second end of the stationary tube 96 is a padding 101 comprised of a foam covering over the raw end of the stationary tube 96.

Figure 8:
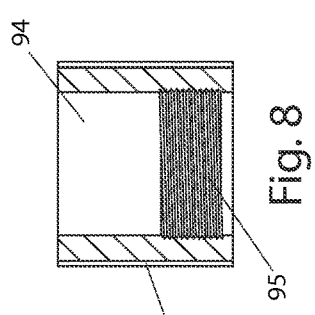
FIG. 8 is a cross-section along line C-C as seen in FIG. 6 of a collet ring 93 of the automatic automotive detailing tool 10 in accordance to the preferred embodiment of the present invention; and, FIG. 9 is a perspective view of a first end of a stationary tube 96 of the automatic automotive detailing tool 10 in accordance with the preferred embodiment of the present invention.

The collet ring 93, as seen in FIG. 8, is comprised of an annular ring, preferably of a thermoplastic material, formed with an internal collet taper 94 and an internal collet thread 95. The internal collet taper 94 would preferably be the complementary form of the external taper 98 disposed upon the stationary tube 96, while the internal collet thread 95 would be a mating thread to the external thread 99 on said stationary tube 96. It is understood that other materials may be used in the fabrication of the collet ring 93 without limiting the scope of the tool 10.

According to the preferred embodiment, the second end of the extending tube 92 would be inserted through the collet ring 93, in such a manner as to first pass through the internal collet taper 94 and then through the internal collet thread 95, and into the first end of the stationary tube 96 to a depth equivalent to the desired final length of the extension pole 90. The collet ring 93 would be installed over the stationary tube 96 until the internal collet thread 95 engaged with the external thread 99 on said stationary tube 96. The engagement of the mating threads preferably beyond three (3) turns would result in contact of the internal collet taper 94 with the external taper 98 on the stationary tube 96. The further engagement of the internal collet thread 95 with the external thread 99 would result in the deformation of the first end of the stationary tube 96 and the consequential narrowing of the kerf 97 to the point of interfering with the wall of the extending tube 92 and limiting the telescoping action between said extending tube 92 and said stationary tube 96. It is understood that the external taper 98 of the stationary tube 96 may be modified to eliminate any taper without limiting the scope of the invention.

It is further understood that the tool 10 may be configured without the extending tube 92 and the collet ring 93 if desired, by the alternate insertion of a threaded end 91 into the first end of the stationary tube 96 and the elimination of the external taper 98 and the external thread 99, thereby providing a limited extension function to the tool 10.

The preferred embodiment of the present invention can be utilized by an enabled individual in a simple and straightforward manner with little or no training. After initial purchase or acquisition of the tool 10, it would be configured as indicated in FIG. 1 or alternately FIG. 2. The method of utilizing the tool 10 may be achieved by performing the following steps: acquiring a model of the tool 10; installing the appropriate attachment 51, 52, 53, or 54 onto the chuck 45 according to the particular task that needs to be accomplished; sliding the on/off switch 31 to the ON position to activate the motor 33 and simultaneously rotating the drive shaft 34 and pad 50; cleaning, buffing, or polish a desired item; and sliding the on/off switch 31 to OFF position when the task is completed. A soap solution can be dispensed from the soap container 60 onto a brush 54, a scrubbing pad 52, or a cleaning pad 51 by filling the soap container with the desired solution; installing the soap container into the carrier 67; and depressing the pump switch 76.

The tool 10 may be used at an extended position as seen in FIG. 1 by threading the threaded end 91 of the extension pole 90 into the internally threaded well 25 in the handle 24; loosening the collet ring 93; adjusting the extending tube 92 relative to the stationary tube 96; and tightening the collet ring 93.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A cleaning tool, comprising:
   an elongated pole;
   a housing having a handle extending outwardly from said housing at a first side and a cleaning pad retention mechanism located at a second side, said handle removably attachable to said elongated pole;

a reservoir holder for receiving and retaining a reservoir having a volume of a fluid therein, said reservoir holder located on a portion of said housing first side adjacent to said handle and further comprises:
- a carrier head configured to envelop and retain a neck of said reservoir further having a planar portion configured to support a sidewall of said reservoir and an arcuate vertical portion attached to said planar portion to encircle at least a portion of reservoir;
- a carrier pivot feature located on said carrier head and attached to an interior portion of said housing;
- a reservoir attachment means located within said carrier head adapted to removably attach said reservoir neck thereto; and,
- a sealing ring disposed within said carrier neck and adjacent to said reservoir attachment means;
- wherein sealing ring provides a barrier between said carrier head and said reservoir;

a cleaning dispenser in fluid communication with said reservoir;

a cleaning dispenser control means in electrical communication with and for actuating a cleaning actuator; and, a cleaning pad control means in electrical communication with and for actuating said cleaning pad retention mechanism;

wherein said elongated pole is length adjustable to a desired position;

wherein said cleaning pad control means drives said cleaning pad retention mechanism;

wherein a cleaning pad is removably attached to said cleaning pad retention mechanism; and, wherein said cleaning dispenser dispenses an amount of said fluid to be directed towards said cleaning pad when installed on said cleaning pad retention mechanism.

2. The tool of claim 1, wherein said elongated pole further comprises:
- a first tubular member, having a first end and a second end;
- a second tubular member having a third end telescopingly adjustable within said first tube and an attachment means located at a fourth end for attaching said elongated pole to said handle; and,
- a securing means conjoining said first end to said third end;
- wherein said securing means secures said second tubular member relative to said first tubular member at said desired position.

3. The tool of claim 2, wherein said first tubular member further comprises:
- a tapered portion located at said first end, having a first tubular member attachment means for removably attaching said securing means thereto;
- a plurality of kerf cuts each extending inwardly from a terminal edge of said first end along a longitudinal surface of said first tubular member; and,
- a foam covering disposed over a terminal end of said second end.

4. The tool of claim 3, wherein said securing means further comprises a collet ring having an internal collet taper;
- wherein said collet taper comprises a complementary form of said tapered portion of said first tubular member;
- wherein said collet ring is removably attachable to said first tubular member attachment means; and,
- wherein said collet ring, upon tightening on said first tubular member, causes said first end to contact and abut said second tubular member to secure at said desired position.

5. The tool of claim 4, wherein said elongated pole further comprises a corrosion-inhibiting protective material.

6. The tool of claim 3, wherein said securing means further comprises a first threaded portion located at said first end and a second threaded portion located at said third end;
- wherein said first threaded portion correspondingly mates with said second threaded portion; and,
- wherein said first threaded portion correspondingly mates with said handle.

7. The tool of claim 1, wherein said cleaning dispenser further comprises:
- a dip tube adapted to be in fluid communication with said reservoir;
- an air fitting located on an exterior of said carrier head in fluid communication between said cleaning mechanism control means and said reservoir;
- a fluid fitting located on said exterior of said carrier head adjacent to said air fitting, said fluid fitting in fluid communication with said dip tube;
- a conveying tube in fluid communication with said fluid fitting; and,
- an exit fitting located at an interior bottom surface of said housing second side adjacent to said drive shaft, said exit fitting in fluid communication with said conveying tube;
- wherein said cleaning mechanism control means directs fluid from said reservoir to said exit fitting; and,
- wherein said exit fitting directs said fluid towards said cleaning pad when installed on said pivoting mechanism.

8. The tool of claim 1, wherein said reservoir further comprises:
- a cylindrical sidewall adjoined to a neck and terminating in a bottom to form an interior; and,
- an attachment means located on said neck for removable attachment to said receiver holder.

9. The tool of claim 1, wherein said cleaning dispenser control means further comprises:
- an air pump motor housed within said housing, having an outlet in fluid communication with said air fitting; and,
- a pump switch located on an exterior of said housing first side and in electrical communication with said air pump motor;
- wherein said air pump motor, upon activation, supplies compressed air to transfer said fluid from said reservoir to said cleaner dispenser.

10. The tool of claim 1, wherein said cleaning pad retention mechanism further comprises:
- a motor housed within and secured to said housing;
- a drive shaft having a first end operably connected to said motor and projecting through said housing second side and supported in said housing with a bearing;
- a spindle, having a first end operably connected to a second end of said drive shaft, further having a spindle hub and a second end;
- an inner retainer removably attachable to said spindle second end;
- a pivoting mechanism having an inner diameter able to contact said drive shaft second end; and,
- a diaphragm having a center aperture, a first side supported on said spindle hub and positioned between said inner retainer and said spindle, and a second side supported on said pivoting mechanism such that said pivoting mechanism is secured thereto;

wherein said motor is in electrical communication with said cleaning pad control means;

wherein said cleaning pad is removably attached to said pivoting mechanism;

wherein said pivot mechanism pivots said cleaning pad relative to said housing; and, wherein said motor drives said pivoting mechanism concurrently when attached to said spindle and said drive shaft.

11. The tool of claim 10, wherein said pivoting mechanism further comprises:

a chuck having a step feature disposed in a first surface thereof and further having at least two drive pins inserted into an outer periphery at a location subjacent said feature; and, an outer retainer removably attachable to said chuck;

wherein said diaphragm second side is supported on said step feature and positioned between said step feature and said outer retainer.

12. The tool of claim 10, wherein said diaphragm further comprises an elastomeric material.

13. The tool of claim 10, wherein said cleaning pad further comprises:

a receiver having a concentric step feature located at a center portion of a first side thereof;

at least two drive pin cavities located at a periphery of said step feature, each cavity for removably receiving an individual one of said at least two drive pins of said chuck;

a pin retainer within each drive pin cavity to retain an individual drive pin therewithin;

a planar discus, having a first side attached to a second side of said receiver; and, a pad body attached to a second side of said discus;

wherein a counter-clockwise rotation of said receiver disengages each drive pin from each pin retainer; and, wherein attachment of said receiver to said chuck enables concurrent rotation of said receiver with said pivoting mechanism.

14. The tool of claim 13, wherein said pad body comprises an open-cell foam material.

15. The tool of claim 13, wherein said pad body is a scrubbing pad preferably comprised of a mesh textile or modified plastic material.

16. The tool of claim 13, wherein said pad body is a polishing pad comprised of a layered microfiber textile material.

17. The tool of claim 13, wherein said pad body is a brush comprising a brush body having attached bristles.

18. The tool of claim 10, wherein said cleaning pad control means further comprises:

a battery pack removably attached to a battery carriage located on said housing, said battery pack; and, a power switch located on an exterior of said housing first side and in electrical communication between said battery pack and said motor.

19. The tool of claim 18, wherein said battery pack is rechargeable.

* * * * *